(12) United States Patent
Reimold et al.

(10) Patent No.: US 6,211,582 B1
(45) Date of Patent: Apr. 3, 2001

(54) ELECTRICAL SWITCHING DEVICE (75) Inventors: Günther Reimold, Oberderdingen-Flehingen (DE); Nils Platt, Huntington Beach, CA (US); Siegfried Mannuss, Sternenfels (DE)

(73) Assignee: E.G.O. Elektro-Geratebau GmbH (DE)

(*) Notice: Subject to any disclaimer, the term of this patent is extended or adjusted under 35 U.S.C. 154(b) by 0 days.

(21) Appl. No.: 09/364,229

(22) Filed: Jul. 29, 1999

(30) Foreign Application Priority Data

Jul. 29, 1998 (DE) ............................................. 198 33 983

(51) Int. Cl.[7] .................................................... H01H 35/00
(52) U.S. Cl. ............................................. 307/117; 337/368
(58) Field of Search ............................... 307/117; 337/89, 337/102, 119, 368

(56) References Cited

U.S. PATENT DOCUMENTS

| 3,202,166 | 8/1965 | Butler . | |
|---|---|---|---|
| 4,206,344 | 6/1980 | Fischer et al. . | |
| 4,656,733 | 4/1987 | Maenishi et al. . | |
| 4,672,353 | * 6/1987 | Ubukata et al. | 337/368 |
| 4,704,595 | 11/1987 | Essig et al. . | |
| 4,839,626 | 6/1989 | Hollweck . | |
| 5,309,131 | * 5/1994 | Hofsäss et al. | 337/102 |
| 5,770,825 | 6/1998 | Yamaguchi et al. . | |

FOREIGN PATENT DOCUMENTS

| 1 222 566 | 8/1966 | (DE) . |
|---|---|---|
| 1 490 743 | 6/1970 | (DE) . |
| 2 625 716 | 12/1977 | (DE) . |
| 26 25 716 | 12/1977 | (DE) . |
| 86 20 387 | 7/1986 | (DE) . |
| 93 05 073 | 4/1993 | (DE) . |
| 195 11 877 | 10/1996 | (DE) . |
| 297 10 464 | 8/1997 | (DE) . |
| 197 01 950 | 1/1998 | (DE) . |
| 91 17 243 | 3/1998 | (DE) . |
| 0 194 512 | 9/1986 | (EP) . |
| 0 285 086 | 10/1988 | (EP) . |
| 678 882 | 10/1995 | (EP) . |
| 0 780 862 | 6/1997 | (EP) . |

OTHER PUBLICATIONS

Taubitz, G.: Kunststoffumspritzte Matallteile für Elektrotechnik und Elektronik. In: elektroanzeiger, 38 Jg., 1985, Nr. 4, S 50–54.

* cited by examiner

Primary Examiner—Stephen W. Jackson
Assistant Examiner—Sharon Polk
(74) Attorney, Agent, or Firm—Akerman Senterfitt (57) ABSTRACT An electrical switching device includes a switching device socket and terminals. The device also includes a snap-action switch with at least one catch spring. The catch spring carries at least one switching contact stud. The snap-action switch is trippable by a thermobimetal. For thermal influencing the thermobimetal, a heating device with a heating resistor mounted on a metal support is provided. The metal support can be made from a steel plate carrying an electrically insulating layer made from glass. An extensive heating resistor is provided on the insulating glass.

13 Claims, 6 Drawing Sheets

ELECTRICAL SWITCHING DEVICE

BACKGROUND OF THE INVENTION

The invention relates to an electrical switching device, particularly a timing or clocking power control device, with a switching device socket and terminals. The electrical switching device has a snap-action switch with at least one catch spring, which carries at least one switching contact stud. The snap-action switch can be tripped by a thermomechanical switching member.

Such switching devices are known from DE 26 25 716. Further known are heating devices for thermomechanical switching members being made up of supports of isinglass or ceramics, carrying a heating resistor or the like. Heating resistors often are made up of thin wire which, in consequence of applying a voltage, produces heat. The problem with such supports for heating resistors is that the materials are easily breakable and difficult to produce because of their characteristics.

SUMMARY OF THE INVENTION

The purpose of the invention is to provide a switching and heating device containing a support which is easier to use, handle and produce.

This problem is solved by an electrical switching device having the features of claim 1. The heating device has a metal support for at least one heating resistor for the thermo-influencing of the thermomechanical switching member. The metal support can be easily handled and is in no danger of breaking easily.

The thermomechanical switching member is preferably a thermobimetal and, in a particularly preferred arrangement, the coating having the higher expansion coefficient points towards the support or the heating resistor.

In an embodiment of the invention, the support comprises a flat material, and is preferably a plate with a thickness between 0.1 and 4 mm, e.g. approximately 1 mm. The plate can be rectangular.

The support advantageously has an electrically insulating layer between at least one surface and at least one heating resistor. It can be fitted in a non-detachable manner to the top of the support and essentially covers the support. An insulating layer, for example, can be applied by a thick-film process and is preferably vitreous or constituted by glass. Alternatively, insulating films or the like can be used, possibly made from synthetic materials able to withstand high temperatures. An insulating layer of glass or the like applied by a thick-film process can make it possible to apply flat and directly thereto a heating resistor, thereby forming a thick-film heating resistor. It can be connected to at least one contact or a metal contact bank, which can also be applied in a thick-film process. A contact bank can at least partially applied directly to the insulating layer and, in some areas, can overlap or coincide with the heating resistor to form an electrical contact. Preferably, a second contact bank can rest directly on the support material and contact the support. For this purpose, the insulating layer preferably only partially covers a surface of the support, so that in the free, uncovered portion the contact bank can rest directly on the support. Thus, the support is connected via the contact bank to the heating resistor or to one end thereof. It is also possible to have a third contact bank, which forms a center tap of the heating resistor. It is preferably located on the insulating layer and projects laterally under the heating resistor.

The surface of the support is preferably at least partially formed from a steel suitable for the thick-film process, namely, a so-called thick-film steel. More details can be found in EP-A 885 579. According to one embodiment, the support comprises several nondetachably interconnected layers, particularly at least one thick-film steel layer as the outside for the heating device and at least one copper containing layer. Preferably, the layer structure of the support is symmetrical to its median plane and, in a particularly preferred embodiment, has a core layer of copper and outer layers of thick-film steel. This structure has the advantage of avoiding a bimetal effect of the support because the copper core is substantially enclosed. The central copper layer should be thicker than the outer layers, preferably two to twenty times as thick and, most preferably, approximately four times as thick. Such a material can be produced, for example, in a large-area form by plating individual metal sheets or the like and then cutting out and separating the individual support plates.

The support can be secured to the switching member, for example, by contact welding. The switching member is preferably metallic and electrically conductive and can form an electrical terminal for the heating device. The support and switching member can be in flat contact in the vicinity of their connection and both are at least partially flat and planar. In one embodiment, the switching member can be spaced roughly from the central third of the support or the heating resistor thereof, and preferably has a limited, roughly identical spacing with respect thereto and in the longitudinal direction projects well beyond the support. The switching member is preferably elongated and engages the catch spring with its free end, particularly on a free end of the catch spring. The end of the switching member can be bent in a hook-like manner and advantageously has, in the hook-like bend, a recess in the longitudinal direction of the switching member.

One possibility of an adjusting device for modifying the spacing between the switching member and the catch spring can be provided in the vicinity of the free end of the switching member, for example, in the hook-like bend. An adjustment can take place through a rotary or turning movement. For this purpose, it is advantageous to provide a pin with a circumferential and constantly increasing diameter widening, which is mounted in the bend and engages with the diameter widening on the free end of the catch spring. A spacing change can be brought about by turning. If the turning axis and/or pin axis are perpendicular to the switching member movement direction, a force occurring in the axial direction during adjustment leads to no regulation or setting of the catch spring and a precise adjustment is possible. For adjustment purposes a portion of the pin preferably has tool working faces. The diameter widening preferably runs in the elongated recess. If the bend for the pin carries radially outwards the more strongly expanding layer of the switching member or thermobimetal, the bend on heating closes and fixes the adjusting pin, so that a rotation thereof can be avoided.

Alternatively, an adjusting device can act on the support, particularly on the side remote from the switching member and/or on the heating device. As a result, the position of the support and/or the catch spring can be determined relative to a mounting of the catch spring, with which the support is connected by means of the switching member engaging on said spring. According to a further development, the adjusting device is at least partially electrically conductive, preferably metallic and advantageously forms an electrical terminal for the heating resistor. One possibility is constituted by a metal screw mounted in the switching device socket and which points in the switching member movement direction and engages on a contact or contact bank of the heating resistor. The screw bearing can be connected to a terminal for the switching device and is in particular in one piece. For improved insulation, the connection can at least partially run within the switching device socket and is preferably injection molded into it during manufacture. It is thus possible to provide a tag or the like at a point different to the terminal for the heating device.

The switching member can be resiliently fixed to the switching device socket, preferably on a portion of the terminal for the switching device extending over the inside of said socket. It preferably engages under elastic tension on a regulating device or its position. With the support for the heating resistor, it can engage on a contact device for the heating means.

The catch spring is preferably fixed to the switching device socket by means of an elastic carrying plate connected to the free end of said spring. With elastic tension, it is pressed in the direction of the switching member and for this purpose the carrying plate can be bent roughly U-shaped and carries both the switching member and also presses both devices onto one another.

To the carrying plate can be fitted a slider, which elastically engages with a projection on a regulating device and in this way fixes the catch spring position relative to the regulating device. It can be fixed to the side remote from the catch spring, preferably in the vicinity of the fastening of the carrier plate to the switching device socket.

The regulating device preferably has a control spindle with at least one cam roller, whose radius at least zonally increases. By turning the control spindle with cam roller, the position of the catch spring can be modified, e.g. the spacing between the free end and the switching member is modified.

In this way, it is possible to have an electrical contacting of the heating device on the one hand by means of the adjusting device and on the other by means of the support and switching member, which is generally in any case under tension.

The catch spring is preferably constructed as a bistable three-point leaf spring and in particular in one piece. It preferably has two hairpin-shaped legs, which are interconnected and at least one and preferably both ends and one connected end carries on an extension of the switching contact stud. Between the legs can pass one end, particularly the spring tongue passing out with the switching contact stud and is supported on an abutment. The spring tongue is normally biased with respect to the legs and stores part of the switching energy for the switching process.

The slider can be constructed as a thermobimetal and preferably forms the abutment for the catch spring tongue. It is possible to construct it as a compensating bimetal with the same bending direction as the switching member. This makes it possible to compensate an ambient temperature change caused by external circumstances and consequently a shape change of the switching bimetal, so as to ensure an exact switching behavior in a wide ambient temperature range.

These and further features can be gathered from the claims, description and drawings and the individual features, both singly or in subcombinations, can be implemented in an embodiment of the invention and in other fields and can represent advantageous, independently protectable constructions for which protection is hereby claimed. The subdivision of the application into individual sections and the subtitles in no way limit the general validity of the statements made thereunder.

BRIEF DESCRIPTION OF THE DRAWINGS

Embodiments of the invention are described in greater detail hereinafter relative to the attached drawings, which show.

DETAILED DESCRIPTION OF THE PREFERRED EMBODIMENTS

Figure 1:
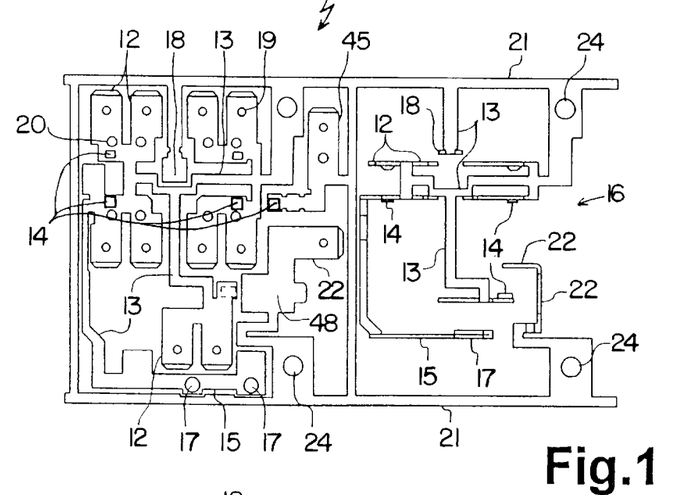
FIG. 1 A blank worked from flat material and having terminals which are zonally already bent round.

FIG. 1 shows a portion of a flat material band 11 from which are worked terminals in the form of plug-in tags or lugs 12, together with the mutual connections. These can be manufactured, for example, by mechanical punching. It is also possible to use laser beam cutting, or in the case of thin materials, even high pressure water jets. The plurality of plug-in tags 12 is arranged in pairs, juxtaposed and interconnected, where the connecting webs 13 pass between the tags or tag pairs. In part, the terminals carry contact studs 14. In the lower portion of the flat material band 11 is a holding web 15, which has two bores 17 for receiving a setscrew. The left-hand portion of the flat material band 11 shows a stage following the forming of the tags 12 and the connecting webs 13. The right-hand portion shows a blank, which has been produced by a corresponding bending round the plug-in tags 12 and the connecting webs 13 in the plane of the drawing. The holding web 15 is placed upright and its end is bent round in such a way that the two bores 17 are in alignment. It is possible to construct several blanks from a flat material and they can be cohesive, such as one sheet of flat material.

Beside the contact studs 14, on the tags 12, locking openings 19 and filling holes 20 are provided, in which engage the plug-in shoes or which can fill the plastics material for an improved hold.

A metallic fastening clip 18 projects from above, between the tags 12. To this clip can be fixed a foam block as a spring suspension for the switch parts. In addition, feed holes 24, a single tag 22 with a metal plate 48, and an additional terminal 45 are provided.

Figures 2, 4:
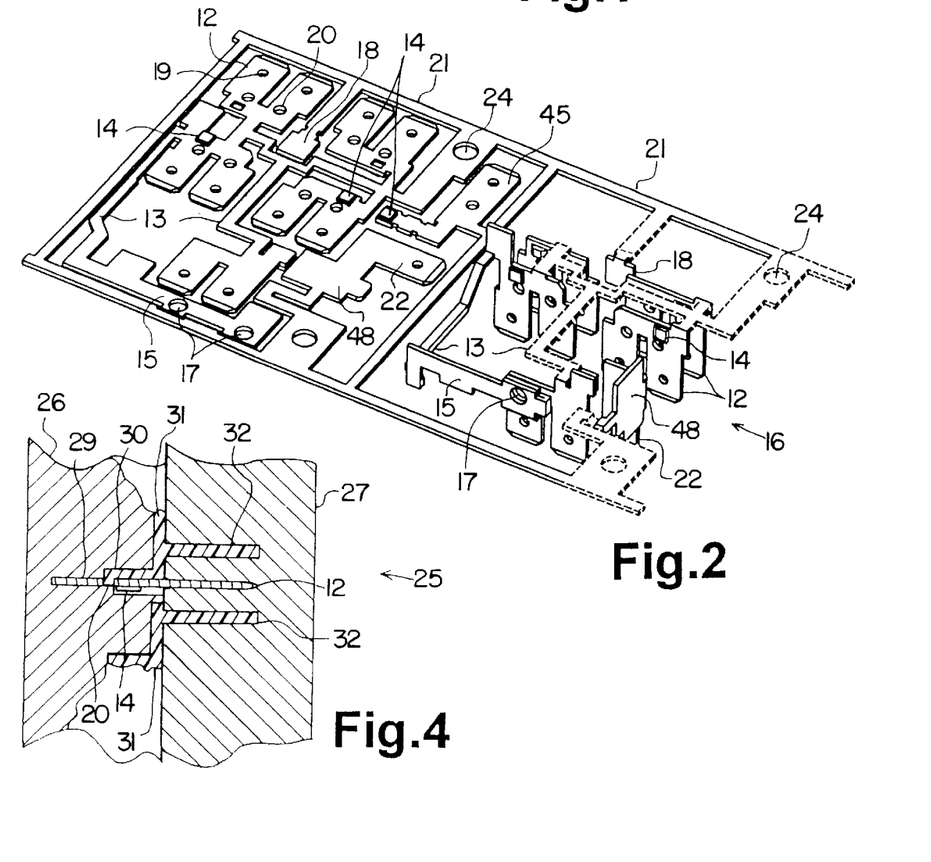
FIG. 2 An inclined view of the blank of FIG. 1.
FIG. 4 A cross-section through a blank between two injection molding mold halves.

FIG. 2 shows in an inclined view of the flat material 11 from FIG. 1, the arrangement of the bent round or upright plug-in tags 12, connecting webs 13, together with the holding web 15 and fastening clip 18 of blank 16. The parts shown in broken line form are not necessary for the subsequent wiring in the switching device socket or are interfering and are at least partially removed. All that is retained is the connecting web 13 leading from a group of tags 12 to the holding web 15. In particular, although the central connecting web 13 is retained during the injection molding process, it is subsequently removed. The rear connection of the blank 16 to the outer frame 21 can be cut through in the method shown in FIG. 2 up to the tags 12, without impairing the unity of the blank 16.

Only an additional terminal 45 with the contact stud 14 is not connected to the blank 16 in the embodiments shown. It is worked from the flat material band 11 and can be incorporated or inserted during the injection molding process or subsequently in the switching device socket.

An advantage is that the entire blank 16, in conjunction with the outer frame 21, is retained by the connecting webs 13 and can consequently be supplied as a subassembly to the injection molding process. In the outer frame 21 are provided projections feed holes 24, through which the flat material band can be reliably positioned, accurately engaged and fed during automatic manufacture.

Figure 3:
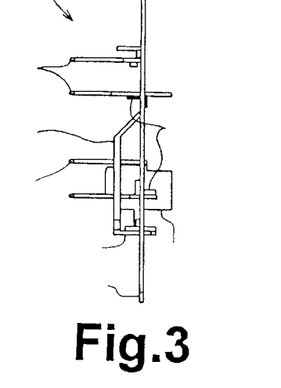
FIG. 3 A side view of the blank of FIG. 1.

FIG. 3 shows that the plug-in tags 12 and 22 can be worked from the blank 16 in rows, in parallel and with a common height. It can be seen that the connecting web 13 leading to the holding web 15 is partially removed from the plane of the outer frame 21. The purpose of this special arrangement will be explained hereinafter.

FIG. 4 shows, in section, part of the blank 16 in an injection mold 25, which comprises an upper mold half 26 and a lower mold half 27. Depicted for the blank 16 is shown a plug-in tag 12 with a contact stud 14 and a projecting length 29 connected thereto. Connecting on to the contact stud 14, the flat material has a filling hole 20, which is filled with plastics material to a support portion cast onto the tag 12. In the area upstream of the contact stud 14, the upper mold half 26 passes in such a way that it remains freely accessible.

Part of the socket base 31 and two separating webs 32 projecting from the underside of the switching device socket are shown. The separating webs pass parallel to the plug-in tags 12 and separate the latter from one another and the outside. The precise construction thereof will be described and explained hereinafter.

Figure 5:
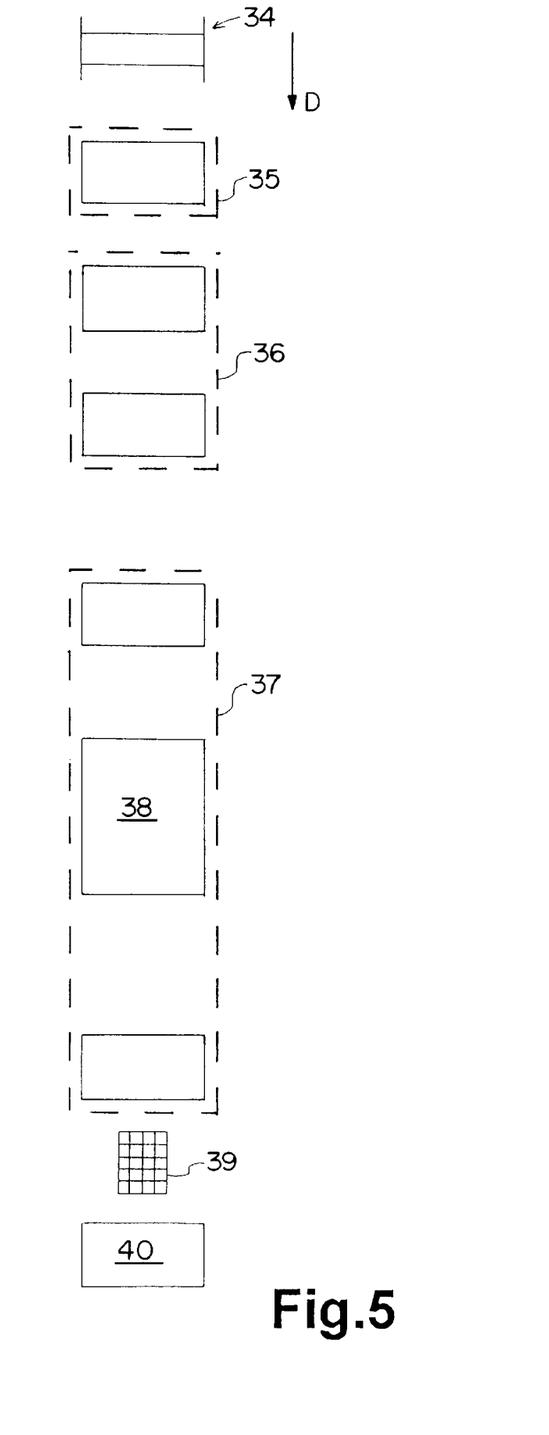
FIG. 5 A diagrammatic production sequence according to the invention for the manufacture of a switching device socket with terminals from flat band material.

FIG. 5 diagrammatically shows an example of the method sequence for the manufacture of blanks 16 from the flat material band and the molding thereof. The passage direction D in FIG. 5 is from top to bottom.

At the start, the flat material, preferably in strip or band form with an appropriate width, is, for example, stored on a drum 34 and rolled off the same. On the same cohesive band, by contact welding at a contact welding station 35, the contact studs are fitted in the correct position on both sides. This can take place at the welding station 35 or at some other station. Part of the contacts can also be produced by stamping.

The flat material 11 provided with the contacts is then rough-worked by punching in processing station 36 in accordance with the left-hand portion of FIG. 1. Then, in processing station 36, tap holes are made in the bores 17, for example, by tapping.

The still cohesive flat material band 11 is then passed from the processing station 36 to the finishing station 37. Finishing involves three working steps. First, the plug-in tags 12 and the connecting web 13 for the holding web 15, and the holding web 15 are bent down or round in accordance with FIGS. 1 to 3. The blank 16, either still connected to the outer frame 21 or already separated therefrom and preferably cohesive therein, is brought into a molding means 38 and into an injection mold 25 according to FIG. 4 and is correspondingly at least partially plastic-molded. The final stage in finishing station 37 is the separation of the blank 16, namely the cutting off of the undesired connecting webs 13 within the tags by punching through the injection molded socket base 31. Optionally, the connections to the outer frame 21 which project from the socket base are cut through. Following the working steps in the finishing station 37, the switching device socket is complete and can be supplied to further processing stations, for example, in crates 39, such as to the assembly means 40. Several flat material bands can pass in parallel through the same stations.

Interlinked machines or plants are illustrated by the broken line representation of stations 35, 36 and 37 in FIG. 5, but this has no effect on the method principle. Single machines are also possible for each working step, as are other combinations or a single plant. The sequence of the operating steps and, particularly upstream of the finishing station 37, can also be varied.

Figure 6:
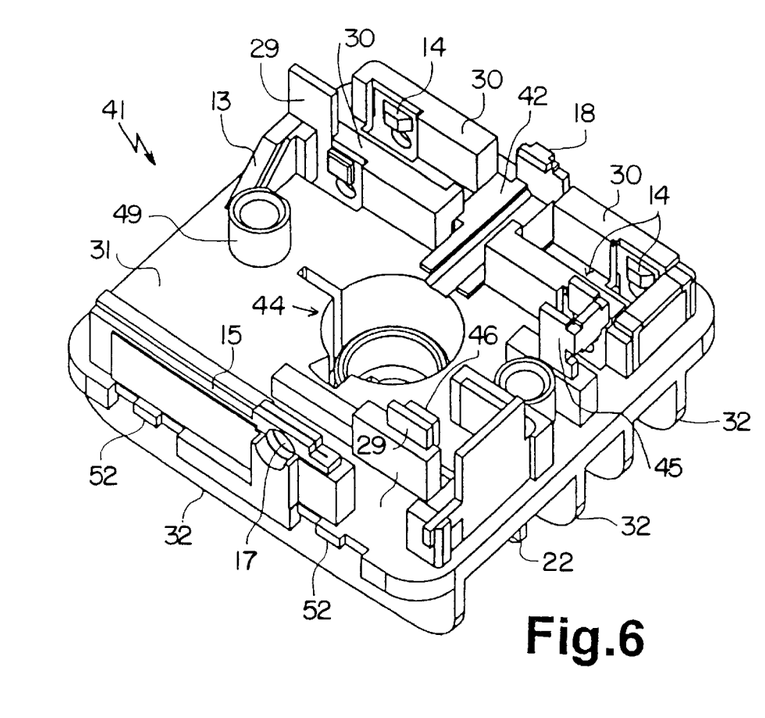
FIG. 6 An inclined view of the inside of the inventive switching device socket.

FIG. 6 shows a switching device socket 41, for example, manufactured according to the inventive manufacturing method. It can be seen that on a substantially flat socket base 31 are mounted or shaped structures such as, for example, the support portions 30. The projecting lengths 29 of the terminals project over the support portions 30, whereas the upper portions of the plug-in tags 12 with contact studs 14 engage on the support portions. It is possible to see four contact studs 14 located in the lateral areas between which is formed a longitudinal guide 42 for a slide switch to be described hereinafter. The fastening clip 18 is provided at the end on the edge of the switching device socket 41.

Roughly in the center of the switching device socket 41 is provided a substantially circular holder 44 for the switching device control spindle. Its specific construction will be described hereinafter.

On the switching device socket 41 on the right-hand side of FIG. 6 is provided an additional terminal 45 which projects well above the socket base 31 and has a portion bent twice at right angles and a contact stud 14. The contact stud 14 can engage an actuating arm (not shown), with a switching contact fitted to the projecting length 29 on the opposite side, which can be opened or closed by operation through the control spindle. The actuating arm passes well above the four lower contact studs 14, so that operation can take place in separate planes.

The additional terminal 45, which in the represented embodiment was not placed in a cohesive blank 16 with the upper terminals in the injection mold 25, can either be separately brought into the mold or can be subsequently fixed in the socket. For example, terminal 45 can be inserted by pressing it into a pre-shaped cutout.

Close to the holder 44, the opposite contact stud 46 for the appliance switch is provided on a terminal, which is also supported on a support portion 30 of the socket 41. Laterally alongside the same, in the vicinity of the socket edge, is provided a projecting, flat material retaining plate 48, to which the appliance switch can be fixed.

At the opposite end of the longitudinal guide 42 is provided the holding web 15, which on its two longitudinal sides is essentially covered by plastic. The threaded bores 17 are kept free of plastic. On the left-hand, rear edge of the socket 41, it is possible to see part of the connecting web 13, which leads from the holding web 15 to the projecting length 29, and therefore to the terminals. For insulation reasons, the connecting web 13 largely passes within the socket base 31 and, as the sole connecting web, was not cut through.

To the left and right of the holder 14 screw receptacles 49 are placed or injection molded onto the socket base and can engage either screws for fastening a casing upper part of the switching device, or for fixing the switching device to, for example, a front panel of an electrical appliance. Separating webs 32 project from the underside of the socket base 31 and are shown in FIG. 7.

Figure 7:
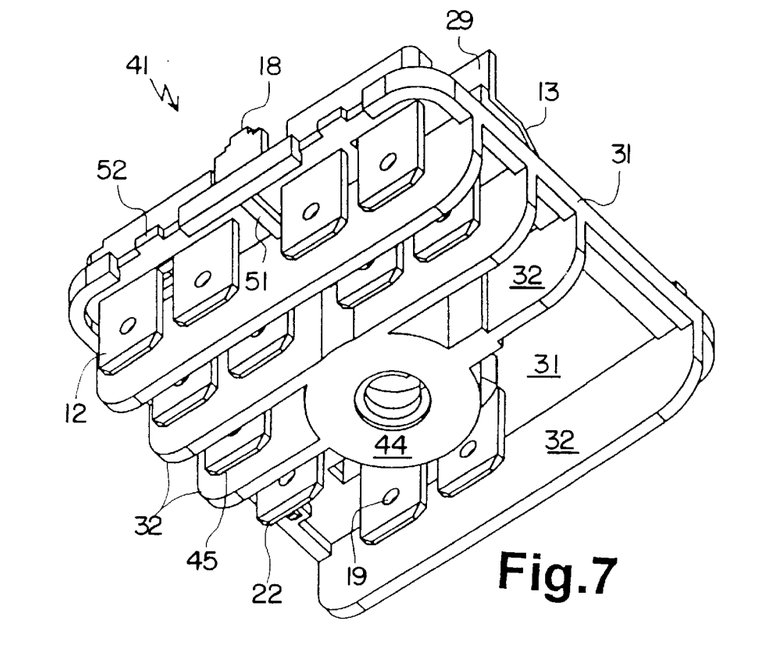
FIG. 7 An inclined view of the back of the switching device socket of FIG. 6.

FIG. 7 shows the switching device socket 41 in FIG. 6 in an inclined view from below. From the socket base 31 projects the parallel oriented plug-in tags 12. In the center of the socket base is shown the holder 44, extending in a cup-shaped manner over the rear surface thereof.

The plug-in tags 12 are arranged in two rows of four and, in each case, two successive tags are interconnected as pairs, followed by the additional terminal 45, connected as a single terminal 22 to the holding plate 48, as well as a pair of successively positioned tags, which have a projecting length 29 carrying the opposite contact 46 and projecting over the inside. The two single plug-in tags are, in each case, arranged with the outermost tags on one side of the two rows of four, in a single row. This leads to the clear arrangement of the tags with, in each case, identical orientation, as shown in FIG. 7. There is still adequate space in the socket 41 for providing further plug-in terminals and the like.

Between the two rows of four and between the additional terminal 45 and the remaining three tags, separating webs 32 are provided. The separating webs 32 pass over the entire width of the socket 41. The central separating web passes along the side of the cup-shaped holder 44, whereas the right-hand separating web passes to either side from the holder. They are continuously injection molded onto the socket base 31. The function of said separating webs 32 is largely to avoid the contacting of plug-in tags, which are separated by the webs, causing short-circuits or the like. For this purpose, the webs at least have the heights of the tags or project over the latter. The separating webs also considerably increase the leakage distances between the parallel plug-in tags and consequently improve the insulation of the switching device. It is also possible for this purpose to shape similar webs, such as, for example, the flat web 51, between tags or pairs in a row.

The separating webs 32 can pass precisely in the center between the plug-in tags 12. They can also be offset somewhat, in order to permit the engagement of those webs which are provided for this purpose on the plug.

The construction of the plug-in tags on the contact studs 14 in pairs serves to significantly simplify further switching operations. Thus, in each case, only one cable has to be connected to the clamp plates (not shown) of the attachment plug. This further reduces the plug costs.

On two sides of the socket base 31, namely those with the fastening clips 18 and threaded bores 17, are two locking projections 52, shaped on the edge in each case. Corresponding locking clips of the casing upper part, can act on the projections in order to connect the socket 41 to an upper part without the use of tools.

Figure 8:
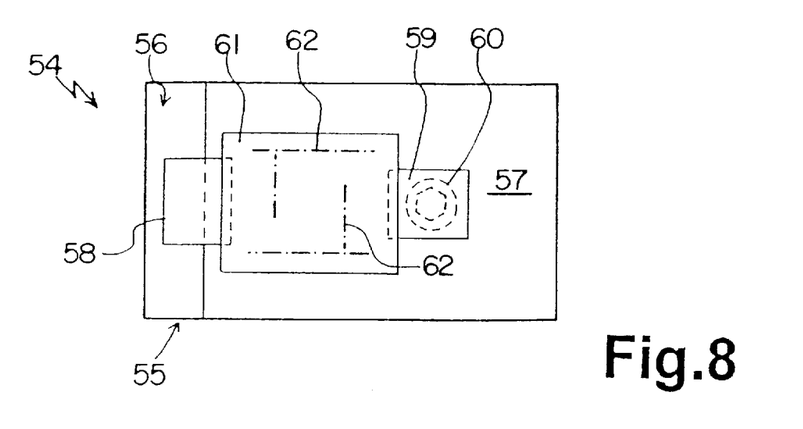
FIG. 8 A plan view of a metal support with thick-film heating resistor and contact banks.

FIG. 8 shows a heating device 54 according to the invention in plan view. It comprises a metal support in the form of a rectangular support plate 55. As described above, the plate can be entirely made from a steel suitable for thick-film processes or can have a sandwich structure with a copper core layer. It is important that it has at least one and advantageously two steel surfaces 56. To the latter is applied an insulating layer 57, a strip of the steel surface 56 (at the left-hand end of the plate) not being covered. To the insulating layer 57, made from glass in a thick film process for example, is applied a connecting contact bank 58, which overlaps in large area form the free strip of the steel surface 56 and rests roughly half on the insulating layer. At a certain distance therefrom, in the right-hand portion of the insulating layer 57, is provided a tapping contact bank 59. Both contact banks 58, 59 are rectangular, but have different sizes. They are advantageously largely made from metal and applied and burned in a thick-film process onto the insulating layer 57 or steel surface 56.

In a third operating process, a layer of resistance material as a flat heating resistor 61 and covering the marginal area of the contact banks 58, 59 is applied and burned into the insulating layer 57. The overlap with respect to the contact banks should be large enough to ensure an adequate and reliable contacting.

For the precise matching of the heating resistor 61 to a desired or predetermined resistance value, it is, for example, possible to cut into the heating resistor 61 using a laser separating line 62, represented in dot-dash line form in the figure. This preferably takes place in an automatic balancing or compensating unit, where permanent measurement takes place during laser cutting of the resistance value of the heating resistor 61 by measuring on both contact banks 58, 59.

In a final operating step, at least to the surface of the heating resistor 61, is applied a passivation layer (not shown), which protects the resistance material against external influences and, for example, prevents the blocking or clogging of the separating line 62 with impurities or pollutants. The passivation layer, which is preferably at least partly made from glass, can theoretically cover the entire side of the heating device 54, with the exception of the tapping contact bank 59. At least in the vicinity of the free strip, the underside of plate 55 should be left free.

In operation, the contacting of the heating resistor 61 takes place on the one hand via the support plate 55 and the connecting contact bank 58. On the other hand, a further contacting takes place on the tapping contact bank 59, for example, on a hexagonal socket head screw 60 passing into the drawing plane and represented in dotted line form. Details are apparent from FIGS. 9 and 10.

The heating devices 54 can either be manufactured in a large-area manner from a corresponding flat material by the application of the corresponding layers in multiple form to large surface areas and subsequent singling into individual heaters. Alternatively, the support 55 is brought to a corresponding size and the layer structure is then applied thereto.

The advantage of the first method is the improved handling of large metal plates and more rational machining methods.

Figure 9:
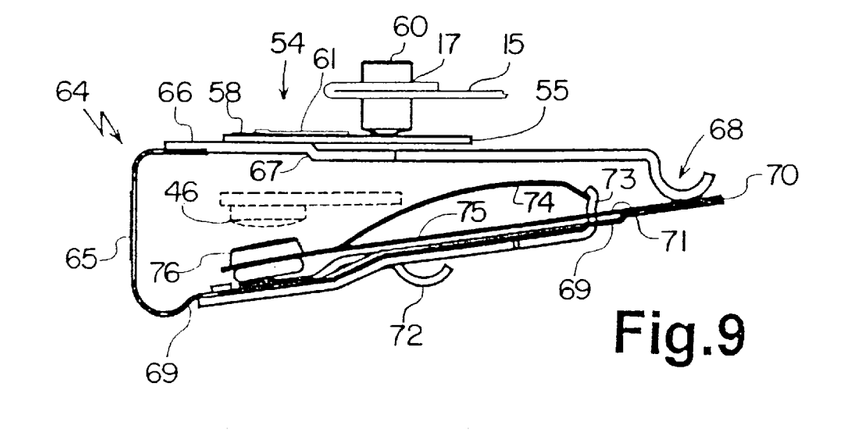
FIG. 9 A side view of a snap-action switch with a support from FIG. 8.

FIG. 9 is a side view of a snap-action switch 64 used as an appliance switch. To a U-shaped carrying plate 65 is fixed on an upper, short leg, a thermo-bimetal strip 66 as the switching member, for example, using contact welding or riveting. At a certain distance from this connection, the bimetal strip 66 has a double bend 67, then continues on to the right in FIG. 9 in the same direction. The strip ends in a downwardly and rightwardly bent terminal hook 68.

Between the connection of the bimetal strip 66 to the carrying plate 65 and the double bend 67 on its upper side is fixed a heating device 54 advantageously by contact welding, and preferably corresponding to FIG. 8. Its heating resistor 61 is roughly in the center above the double bend 67. Thus, part of the heating can be transferred by contact heat directly from the carrying plate 55 to the root area of the thermobimetal. The other part of the heating capacity is transferred by radiant heat or convection from the heating means or support 55 via the air gap to the thermobimetal 66 in the area close to the double bend 67. A heating, preferably of the root area of the thermobimetal strip 66 close to its fixing to the carrying plate 65, brings about a controllable, uniform heating of the bimetal. This leads to a more readily controllable deformation of the strip 66 or position change of the end 68.

On the heating device 54 or on the tapping contact bank 59 (not shown) is provided a setscrew 60, which can be constructed as a hexagonal socket head screw. It is mounted in the holding web 15 or the threaded bores 17. The setscrew 60 serves as a second contacting on the heating resistor 61, as explained above, and leads to a plug connection via the holding web 15 and a not shown connecting web 13 (see FIGS. 1 to 3, 6 and 7).

A further function of the setscrew 60 is the precise adjustment of the position of the thermobimetal strip 66 in a selected state by force transfer by means of the support 55. An adjusting device of this type, apart from a contacting function of the heating means without additional components, has the major advantage that the mounting of the adjusting element, namely the holding web 15, as shown and described relative to FIG. 6, takes place firmly and in an invariable position on the switching device socket 41. Thus, by the application of a tool to the setscrew 60 and the resulting forces, without a rotary movement of the screw there can be no position change to the bimetal strip 66, which could lead to errors. The support 55 advantageously has an adequate material thickness to ensure that it is not pressed against the bimetal strip 66 by the spring tension of the carrying plate 65 on the one hand and the engagement on the screw 60 on the other.

The other, longer leg 69 of the carrying plate 65 is elongated and in FIG. 9 is to the right connected to the end 70 of the catch spring 71, for example, by riveting or welding. To the underside of the lower leg 69 is fitted a further element, which has a slider 72 for engagement on a regulating device for the snap-action switch 64. This element can be constructed as a compensating bimetal with the same layer arrangement as the strip 66, which makes it possible to compensate for external temperature changes. There is also an abutment 73 thereon, on which is supported a spring clip 74 of the catch spring 71. On either side of the spring clip 74 are provided spring legs 75, which are connected to the spring clip at the other end of the spring 71 and carry a switching contact stud 76. Thus, the catch spring 71 is constructed as a three-point leaf spring element.

Between the switching contact stud 76 and the root area of the bimetal strip 66, on a connecting portion in the switching device socket 41, is fitted the opposite contact stud 46. The connecting portion is connected to a not shown plug-in tag 12 in the switching device socket 41. These parts are shown in broken line form because they do not belong to the subassembly of the switch 64.

The thermobimetal 66 comprising two layers has the layer with the lower expansion coefficient on the side towards the catch spring 71. On heating by the heating device 54, there is a curvature of the thermobimetal 66 in the direction of the catch spring 71, downwards in FIG. 9, which actuates the latter by pressure on its free end 70.

With the exception of the adjusting device with the screw 60 and opposite contact stud 46, the snap-action switch 64 forms a subassembly. The snap-action switch 64 is fixed to the switching device socket 41 with the portion of the carrying plate 65 linking the two legs.

Figure 10:
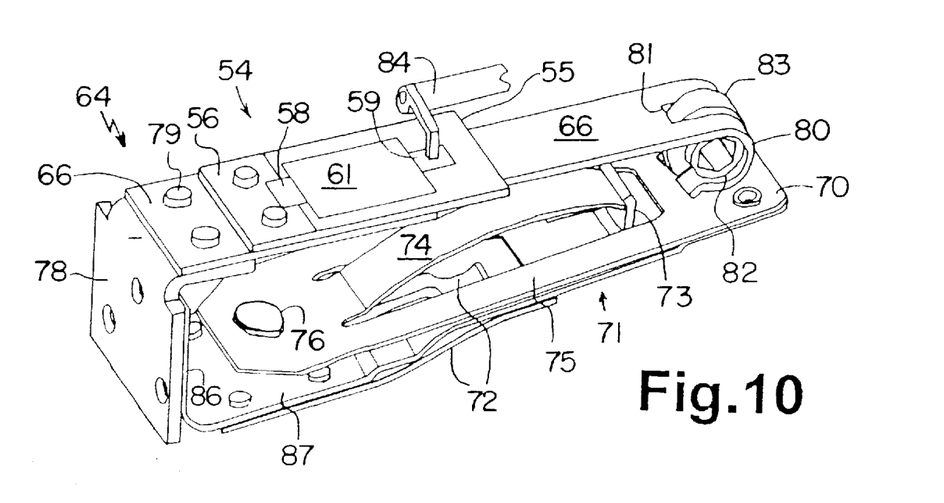
FIG. 10 An inclined view of a variant of the snap-action switch of FIG. 9 with adjusting device at the end of the thermobimetal.

FIG. 10 shows, in an inclined view, a minor modification to a snap-action switch 64 according to the invention, functioning as an appliance switch. A thermobimetal strip 66 is fitted by rivet heads 79 to the downwardly bent leg of a L-shaped base plate 78, much as in FIG. 9. The thermobimetal strip 66 is elongated and has at its free end an inwardly bent reception portion 80, which is provided with a centrally fitted reception slot 81, which passes to the end of the strip 66. In said slot is mounted as an adjusting element an adjusting pin 82, which extends over the width of the strip 66 and carries in its central area a flange-like diameter widening 83. This diameter widening in part represents much more than the thickness of the strip 66 and at its outer circumference forms a curve with a preferably constantly increasing radius. By the outer circumference of the diameter widening 83, the adjusting pin 82 and consequently, the bimetal strip 66, engages on the free end 70 of the catch spring 71. As a function of the position of the adjusting pin 82, and as a result of the changing radius, it is possible to modify the distance between the strip 66 and the catch spring end 70. This is an advantageous construction of an adjusting device for the snap-action switch 64 according to an aspect of the invention.

Much as in FIG. 9, the thermobimetal strip 66 carries, in the vicinity of its fastening to the base plate 78, a heating device 54 in the form of a metal support, together with a thick-film resistance heating means 61 according to FIG. 8. A contact spring 84 engages on the tapping contact bank 59 and, apart from contacting the heating resistor 61 via the connecting contact bank 58 and the support 55 with the base plate 78, serves as a second contacting.

Other than in FIG. 9, to the L-shaped base plate 78 is fixed by riveting a bent down end 86 of the carrying plate 87. Otherwise, the carrying plate 87 with the lower leg 69 and the snap-action switch 64 are constructed as in FIG. 9. Thus, no further details will be given here of the construction of the catch spring 71, slider 72 and switching contact stud 76.

One advantage of this adjusting device is that the application direction of the tool for regulating the adjusting pin 82 is perpendicular to the adjustment action direction. This avoids adulterations during adjustment as a result of the force action of the tool on the adjusting pin 82. The advantage of the represented construction of the reception portion 80 with an inward curvature is that on heating the thermobimetal strip 66, the portion narrows and consequently embraces in a particularly firm and positionally reliable manner the adjusting pin 82. For simplifying the insertion of the pin 82 in the reception portion 80, the forked ends of the strip can be bent upwards somewhat in the manner shown.

Figure 11:
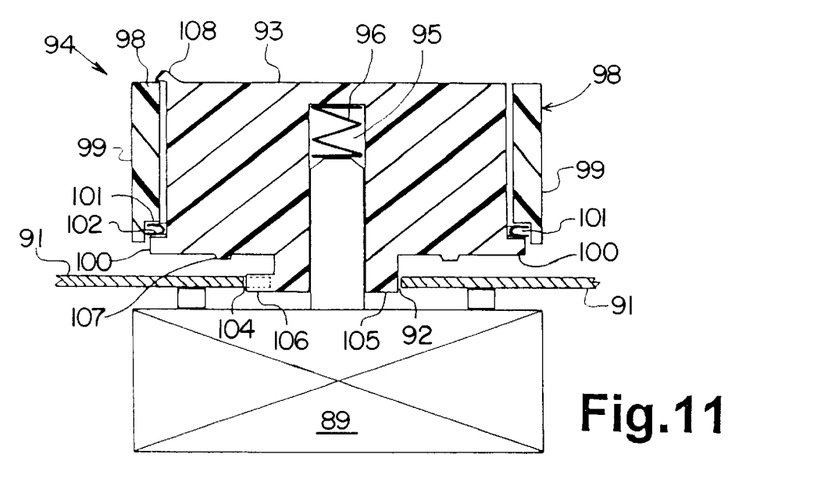
FIG. 11 A cross-section through an arrangement of an electrical switching device behind a front panel with a detachable blocking device between a two-part toggle and front panel.

FIG. 11 shows in section an electrical switching device 89 with a control spindle 90, which is fixed in a not shown manner behind a front panel 91 of an electrical appliance, for example, a kitchen appliance. The control spindle 90 extends through a through opening 92, which has a much larger diameter. A toggle inner part 93 of a switching toggle or lever 94 is mounted on the control spindle 90. The reception bore 95 is constructed so as to correspond to the cross-section of the control spindle 90, with the special feature that the spindle 90 is axially movable therein. By means of a spiral spring 96 the toggle inner part is supported in the vicinity of the bottom of the reception bore 95 constructed as a blind hole on the control spindle 90.

Mounted in rotary manner with respect to and surrounding the toggle inner part 93 is fitted a toggle outer part 98, which has on its outer circumference operating faces 99 for a user of the switching device 89. An inner shoulder 100 on the toggle inner part 93 projects over the internal diameter of the toggle outer part 98 and faces a correspondingly shaped recess 101 in the toggle outer part. Between the two is inserted an annular spring element 102, which for example, in the manner shown in FIG. 11 can have an outwardly open, U-shaped cross-section. Through the spring element 102, the toggle outer part 98 can be resiliently pressed against the toggle inner part 93 or the shoulder 100. In the substantially relaxed state of the spring element 102 shown in FIG. 11, between the toggle inner and outer parts during a rotary movement of the outer part 98, there is no or an extremely slight friction. However, if the outer ring 98 is pressed axially against the inner part 93 against the action of spring element 102, there is a force closure and preferably also a self-closure in the circumferential direction and the inner part can be turned by means of the outer part.

Figure 12:
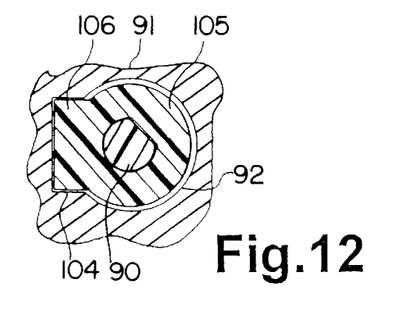
FIG. 12 A section through the blocking device of FIG. 11.

As is clear in the plan view of FIG. 12, the through opening 92 is substantially circular with an angular recess 102. On the inner part 93 is formed a shoulder 105, which projects into the opening 92. Corresponding to the opening 92, the shoulder 105 is constructed with a projection 106 corresponding to the recess 104. In the normal state according to FIG. 11, the projection 106 and recess 104 are substantially at the same height, so that the shoulder 105 cannot be turned with the control spindle 90, because the projection 106 strikes against the recess 104.

For operating the switching device 89 by turning the control spindle 90, the projection 106 must be brought out of the recess 104. Preferably, according to FIG. 11, this takes place by an axial displacement of the inner part 93 towards the front panel 91. However, a pressing in of the inner part 93 takes place by means of the toggle outer part 98 or its operating face 99, so that the inner part is pressed so far in the direction of the front panel 91 until the boundary cam 107 engages on the panel. The projection 106 then no longer engages in the recess 104 and consequently can be turned together with the inner part 93 with respect to the front panel 91. Even a limited turning ensures that when the axial force is no longer applied to the toggle inner part, the recess 104 and projection 106 are no longer superimposed and can consequently no longer automatically come into engagement. Only in a position shown in FIGS. 11 and 12 can the blocking device be activated.

Preferably, the spring constants of the spiral spring 96 and spring element 102 are such that the spiral spring 96 can be compressed much more easily. This has the advantage that through an axial pressing movement of the outer part 98 on the front panel 91, the toggle inner part 93 on the control spindle 90 is pressed in a sliding manner against the panel, which releases the blocking device between shoulder 105 and the panel. Only by further pressing in with increased force, during which the inner part with the boundary cam 107 is supported against the panel, does engagement occur between the toggle inner and outer parts 93, 98. By a rotary movement of the outer part 98, the inner part 93 and, consequently, the control spindle 90 can be turned. This has the advantage that the blocking device is released in an operating stage in which no torques can be transmitted by the toggle outer part 98 to the inner part 93 and consequently no blocking device loading can occur.

As the toggle outer part 98 can be turned freely with respect to the inner part 93 and consequently the switching part 89, an inner part position indication is necessary. This can be for example, in the form of a nose 108, which preferably has a color which is different from that of the toggle 94. As a further function, by catching during the mounting of the toggle outer part 98 on the inner part 93, it can prevent the former from dropping because it projects somewhat over its face.

Referring again to FIG. 12, an example of the construction of the through opening 92 with an angular recess 104, which extends over an angle of roughly 90 degrees, is shown in section within the front panel 91. The shoulder 105 of the toggle inner part 93 is provided with a projection 106 corresponding to the recess 104. In the shoulder 105 runs the one-sided flattened control spindle 90, both parts being mutually axially displaceable without any significant friction. In place of the front panel, a switching device cover can be correspondingly constructed and forms part of the blocking device.

Figure 13:
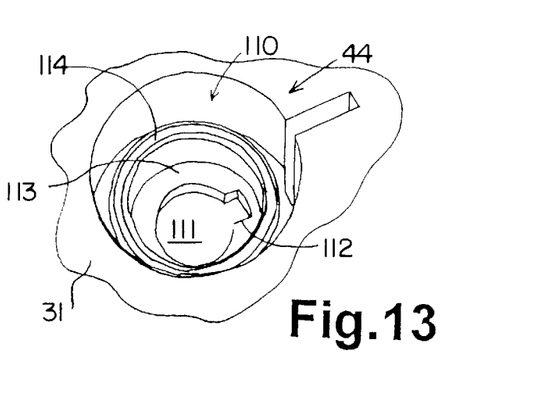
FIG. 13 A variant of a blocking device, which is partly formed by a specially shaped opening in the bottom of the switching device socket.

An alternative possibility for a blocking device is shown in FIG. 13. It shows a possible construction of the holder 44 in the socket base 31, which receives the control spindle 90 of the switching device 89. The holder 44 essentially comprises a circular, blind hole-like recess 110 with a through-bore 111 which, at one point and similar to the through-opening 92 in FIG. 12, has a cutout 112 in the recess bottom 113. On the recess bottom 113 runs a flange-like projection 114, which is somewhat pointed on its face and has a certain distance from the walls of the recess 110.

Figure 14:
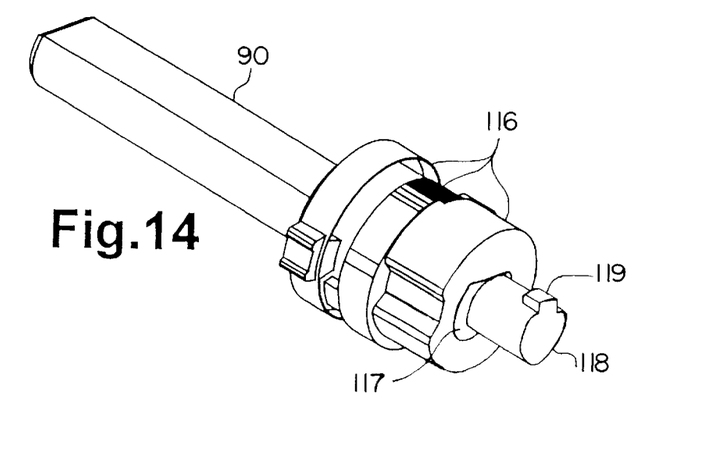
FIG. 14 A control spindle for the switching device with different regulating or cam rollers, which are constructed at one end so as to correspond to the opening in FIG. 13.

A control spindle 90 according to FIG. 14 can be inserted in the holder 44 according to FIG. 13. The maximum diameter of the spindle 90 is somewhat less than the diameter of the projection 114. Several cam rollers 116 are applied to the flattened spindle 90. The inner recesses of the rollers 116 correspond to the cross-section of the control spindle 90 and have a certain clearance with respect to the latter, so that the rollers 116 are axially displaceable relative to the spindle. On the underside of the bottom cam roller 116, the cross-section of the control spindle 90 passes into a circular extension 118, which is concentric to the spindle. It has a locking projection 119, so that the cross-section of extension and projection corresponds to the through-bore 111 in FIG. 13, much as in FIG. 12. On the extension 118 is mounted a spiral spring or the like, which can just be inserted in the projection 114. It is on the one hand supported on the recess bottom 113, and on the other hand on the cross-sectional widening 117, which is constructed as a shoulder between the extension and the flattened profile of the control spindle 90. In the inserted state the underside of the bottom cam roller 116 runs on the face of the projection 114. Through the spiral spring engaging on the cross-sectional widening 117 the control spindle 90 is held in a position in which the locking projection 119 is located in the cutout 112 of the through-bore 111 and as a blocking device prevents a turning of the spindle by self-closure. If the spindle 90 by axial force action is pressed in counter to the spring tension, the projection 119 is located behind the recess bottom 113 and is no longer in engagement with the cutout 112. The control spindle 90 can then be turned freely over an angle of almost 360 degrees and only in a single position, namely the starting position similar to FIG. 12, is the blocking device locked in again by the tension of the spring.

In the construction of a blocking device according to FIGS. 13 and 14 a switching toggle 94 can be firmly seated on the control spindle 90. Here the blocking device is displaced into the switching device socket 41, so that the force to be applied must be taken over by the socket or the connection of the switching device 89 to a mounting support or front panel 91.

Figure 15:
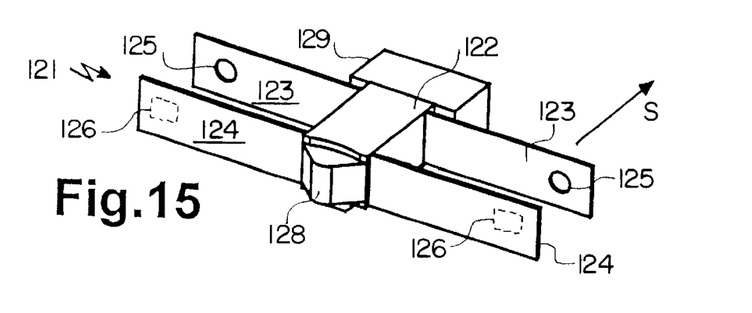
FIG. 15 A switch part with attached foam block as a spring suspension.

FIG. 15 shows a switch part 121 usable as a slide switch. A molded article 122 has a through, thin actuating arm 123 and a through, thick actuating arm 124, whose central area is in each case completely surrounded by the molded article. With the exception of the different material thicknesses, the actuating arms 123 and 124 are substantially identical and cover one another in the longitudinal direction of the molded article 122 or the sliding direction. In the vicinity of the ends of the thin actuating arm 123, stamped contact studs 125 are fitted by stamping. In roughly the same area, the thick actuating arm 124 carries with the same orientation contact studs 126 represented in broken line form and which are manufactured from a special contact material for switching higher electrical power levels and are fitted by welding.

Onto the front face of the molded article 122 is shaped a triangular, rounded locking nose 128. According to an aspect of the invention, to the rear face of the molded article is fitted a parallelepipedic foam block 129, for example, by bonding. It serves as a compression spring for the elastic spring suspension of the switch part 121 against a stop member. The advantages of such a voluminous, plastic spring body are the insulating action and the lack of any need for a complicated guidance for the spring suspension if the lateral extension is greater than that in the loading direction.

Figure 16:
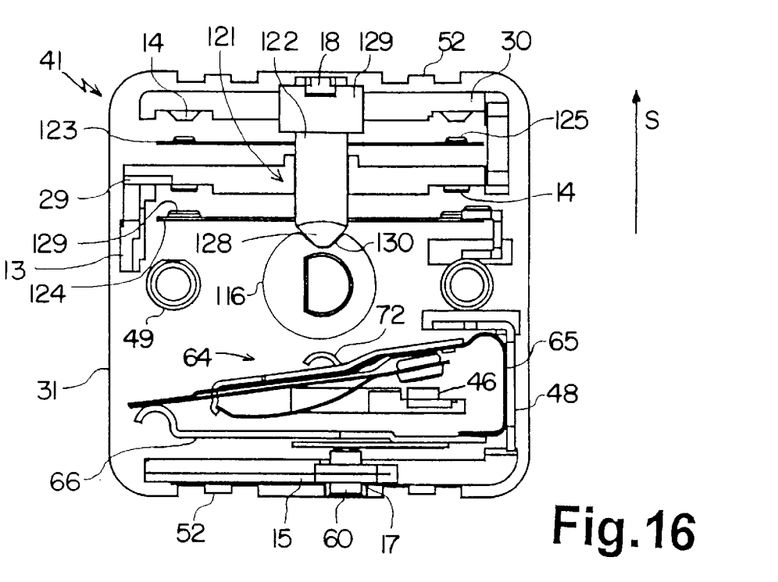
FIG. 16 A plan view of a switching device socket corresponding to FIG. 6 with inserted slide switch with foam block corresponding to FIG. 15.

FIG. 16 shows a plan view of a switching device socket 41 according to FIGS. 6 and 7. The switch part 121 is inserted in the longitudinal guide 42. The foam block 129 is fixed to the fastening clip 18 by bending round an end portion thereof. One advantage of an additional bonding of the foam block 129 to the switch part 121 is that the switch part is mounted in a fixed manner via the foam block 129. Lateral sliding can be prevented both by the fixing by means of the foam block 129 and by a guide nose (not shown) engaging in the longitudinal guide 42.

The locking nose 128 of the molded article 121 engages on a cam roller 116 on the control spindle 90, namely in a switching recess 130, whose depth corresponds to the represented spacing of the contact studs 125 and 126 of the switch part 121 from the contact studs 14 of the switching device socket 41 or somewhat exceeds the same. The switching recess 130 can define a specific position of the control spindle 90, for example, the so-called zero or neutral position. As soon as the locking nose 128 is moved out of the switching recess 130 and engages on the outer radius, by turning the control spindle 90, the switch part 121 is pressed in the sliding direction S against the elastic resistance of the foam suspension. Thus, the contact studs 125 or 126 are applied to the contact studs 14 and in each case connect the same through the actuating arms 123 and 124. Thus, it is possible to initiate switching processes by leaving or reaching the position of the cam roller 116 shown in FIG. 16. This can be for example, an electric signal for operating a display, but it can also be a saucepan detection system or the like.

FIG. 16 also shows a fitted snap-action switch 64 in accordance with FIG. 9, to which further reference will not be made here. The slider 72 engages on a not shown cam roller 116. The snap-action switch 64 can be fixed by contact welding or riveting of the carrying plate 65 with the holding plate 48 to the switching device socket. The setscrew 60 is turned in the holding web 15 after fitting the snap-action switch.

Figure 17:
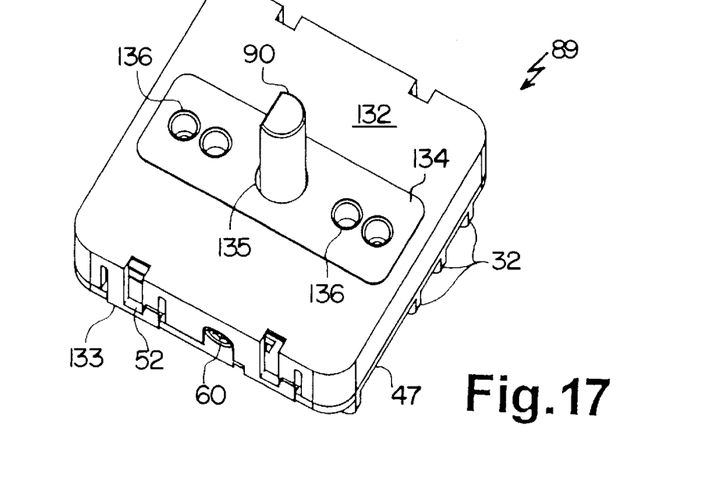
FIG. 17 An inclined view of the front of a finished, preassembled switching device showing the arrangement of the fastening holes on the switching device cover.

FIG. 17 shows an electrical switching device 89 according to the invention with the casing cover 132 placed on the switching device socket 41. By means of U-shaped clips 133, it is fixed to the locking projections 52 of the socket 41 by locking without the aid of tools.

The cover 132 has a centrally directed fastening strip 134, which is preferably made from thin metal or sheet metal. Symmetrically to the passage 135 for the control spindle 90, it has two prefabricated fastening bores 136 into which can be screwed sheet metal screws or the like. Alternatively, the bores 136 can be provided with prefabricated or precut threads. The spacing of the inner pair of bores 136 can, for example, comply with a US standard, and the spacing of the outer pair of bores can, for example, comply with an EU standard. The diameter of the bores can be approximately 4 mm. In the represented construction, the outer bores 136 are roughly over the screw receptacles 49 of the switching device socket 41 in FIG. 6. This permits a screwing down not only of the cover 132, but also the switching device-carrying socket 41 using a mounting support, such as, for example, a front panel 91.

On the lower side of the switching device 89 visible in FIG. 17, it is possible to see the setscrew 70, which can also be reached when the cover 132 is fitted. This makes it possible to adjust the switching device in the assembled state, which is very important for the temperature conditions in the interior. It is also possible to see the separating webs 32.

What is claimed is:

1. Electrical switching device, with a switching device socket and terminals, which has a snap-action switch with at least one catch spring, which carries at least one switching contact stud, said snap-action switch being trippable by a thermomechanical switching member;

wherein a heating device for the thermal influencing of said thermomechanical switching member is provided;

wherein said heating device is provided with a support for at least one heating resistor;

wherein said support is made of metal and has an electrically insulating layer between one surface and said at least one heating resistor; and wherein said at least one heating resistor is a flat, thick-film resistor being directly applied to said insulating layer.

2. Electrical switching device according to claim 1, wherein said metal support is made from flat material and is a flat, elongated plate.

3. Electrical switching device according to claim 2, wherein said metal plate has a thickness of approximately 1 mm.

4. Electrical switching device according to claim 1, wherein said electrically insulating layer is applied in non-detachable manner to one side of said support, substantially covering said side.

5. Electrical switching device according to claim 1, wherein said electrically insulating layer is vitreous or made from glass.

6. Electrical switching device according to claim 1, wherein said heating resistor is connected to a metal contact bank applied by a thick-film process, wherein at least a portion of said metal contact bank is directly applied to said insulating layer and covered by an area of said heating resistor for contacting purposes.

7. Electrical switching device according to claim 6, wherein said metal contact bank rests directly on said support.

8. Electrical switching device according to claim 6, wherein said insulating layer is in direct contact with at least a portion of said support, and said metal contact bank is in direct contact with at least a portion of said support not in direct contact with said insulating layer.

9. Electrical switching device according to claim 1, wherein at least a portion of each of said support and said switching member are planar, and wherein said planar portion of said support directly contacts said planar portion of said switching member.

10. Electrical switching device according to claim 9, herein a central portion of the switching member is spaced from said support with a small spacing.

11. Electrical switching device according to claim 1, wherein an adjusting device acts on said support and determines the position of said support relative to a mounting support of said catch spring, with which said support is connected via said switching member engaging on said catch spring.

12. Electrical switching device according to claim 11, wherein at least a part of said adjusting device is electrically conductive and forms an electrical connection to a contact of said heating resistor and wherein said adjusting device is engaging on said contact with a metal screw mounted in said switching device socket.

13. Electrical switching device according to claim 12, wherein said metal screw is mounted in a bearing being connected to a terminal for said switching device, said connection being in one piece and at least partly being located within said switching device socket.

* * * * *